United States Patent [19]

Kubota et al.

[11] Patent Number: 4,730,874

[45] Date of Patent: Mar. 15, 1988

[54] SEAT FOR VEHICLE

[75] Inventors: Tatsushi Kubota; Mitsuo Inukai; Kazuyoshi Kato, all of Aichi, Japan

[73] Assignees: Kabushiki Kaisha Tokai-Rika-Denki-Seisakusho; Toyota Jidosha Kabushiki Kaisha, both of Japan

[21] Appl. No.: 901,401

[22] Filed: Aug. 28, 1986

[30] Foreign Application Priority Data

Sep. 3, 1985 [JP] Japan .......................... 60-134760[U]

[51] Int. Cl.$^4$ .............................................. B60R 21/10
[52] U.S. Cl. ..................................... 297/464; 280/802
[58] Field of Search ............... 297/464, 468, 484, 483, 297/486, 250; 280/802, 803, 804

[56] References Cited

U.S. PATENT DOCUMENTS

| 4,275,923 | 6/1981 | Molnar | 297/250 |
| 4,312,539 | 1/1982 | Takada | 297/468 |
| 4,413,841 | 11/1983 | Matsuoka et al. | 280/802 |
| 4,426,102 | 1/1984 | Katsuno et al. | 280/804 |
| 4,451,061 | 5/1984 | Takada | 280/802 |
| 4,536,010 | 8/1985 | Matsunami et al. | 280/802 |

Primary Examiner—Peter A. Aschenbrenner
Attorney, Agent, or Firm—Sixbey, Friedman & Leedom

[57] ABSTRACT

A seat for use in a vehicle equipped with an automatic seatbelt system includes a seat cushion for supporting the buttocks of an occupant. The seat cushion is provided with a passage for a webbing of the seatbelt system. Accordingly, it is possible to prevent the contact between the webbing and the seat cushion when the webbing is wound up into and unwound from a webbing retractor.

3 Claims, 5 Drawing Figures

SEAT FOR VEHICLE

BACKGROUND OF THE INVENTION

1. Field of the Invention

The present invention relates to a seat for a vehicle, particularly, an automobile which is equipped with a seatbelt system.

2. Description of the Related Art

A typical conventional seat for an automobile consists of a seat back for supporting the back of an occupant and a seat cushion for supporting his buttocks and thereby allows the occupant to seat himself therein.

Seatbelt systems which are mounted on automobiles are generally designed to restrain the body of an occupant with a webbing so that he is protected in an emergency situation of the vehicle. One type of such seatbelt system is known as an automatic seatbelt system in which a webbing is automatically fastened to the occupant's body.

This type of seatbelt system is arranged such that, as shown in FIGS. 4 and 5, a webbing retractor 11 is secured to a floor member disposed in the center of a vehicle, and the distal end portion of a webbing 13 unwound from the retractor 11 is moved in the longitudinal direction of the vehicle in response to the operation of opening and closing the door, thereby allowing the intermediate portion of the webbing 13 to be automatically fastened to the body of an occupant seated in a seat 15. The intermediate portion of the webbing 13 is supported by a belt guide 17 which is secured to the side of the seat 15 which is closer to the center of the vehicle so that the occupant seated in the seat 15 is maintained in a constant or uniform webbing fastened condition regardless of his changing the position of the seat 15.

The belt guide 17 is pivotally supported by the seat 15 so that, when the direction of pull of the webbing 13 is changed as the door is opened or closed, the belt guide 17 is pivoted in response to the change in the webbing pulling direction, thereby minimizing the frictional resistance occurring between the webbing 13 and the belt guide 17.

However, when the occupant closes the door after leaving the vehicle, the webbing 13 is wound up into the retractor 11 while changing the direction in which it is pulled, and the belt guide 17 is pivoted as shown by the arrow A in FIG. 5. In consequence, the webbing 13 gradually approaches and finally contacts the seat cushion 15A of the seat 15, so that the webbing 13 is wound up into the retractor 11 while rubbing against the seat cushion 15A, resulting in damages to the webbing 13 and the seat cushion 15A. In addition, the friction occurring between the webbing 13 and the seat cushion 15A may cause the webbing 13 to be defectively wound up into the retractor 11.

When the occupant opens the door in order to enter the vehicle, the webbing 13 and the belt guide 17 are activated in the reverse direction to that in the case of closing the door, and the webbing 13 is unwound from the retractor 11 while rubbing against the seat cushion 15A. Therefore, the webbing 13 and the seat cushion 15A may be damaged in the same way as the above. Further, the friction occurring between the webbing 13 and the seat cushion 15A disadvantageously increases the force required for opening the door.

These problems may be solved by installing the belt guide 17 at a position apart upward from the seat cushion 15A. In such case, however, the belt guide 17 may project to the side of the occupant's waist to a substantial degree in such a manner as to obstruct the movement of the occupant.

SUMMARY OF THE INVENTION

In view of the above-described circumstances, it is a primary object of the present invention to provide a seat for a vehicle equipped with an automatic seatbelt system in which the webbing is guided by a belt guide, the seat being so designed that it is possible to prevent the contact between the webbing and the seat cushion.

To this end, the present invention provides a seat for a vehicle equipped with a seatbelt system having a webbing which is wound up into a webbing retractor from one end thereof, which comprises: a seat cushion for supporting the buttocks of an occupant of the vehicle; a seat back for supporting the back of the occupant; and a webbing passage provided in the seat cushion.

By virtue of the above-described arrangement, the webbing passage formed in the seat cushion allows a clearance to be ensured between the seat cushion and the webbing which is positioned directly above the seat cushion, so that it is possible to prevent the contact between the webbing and the seat cushion when the webbing is wound up into and unwound from the webbing retractor.

DESCRIPTION OF THE PREFERRED EMBODIMENT

Figure 1:
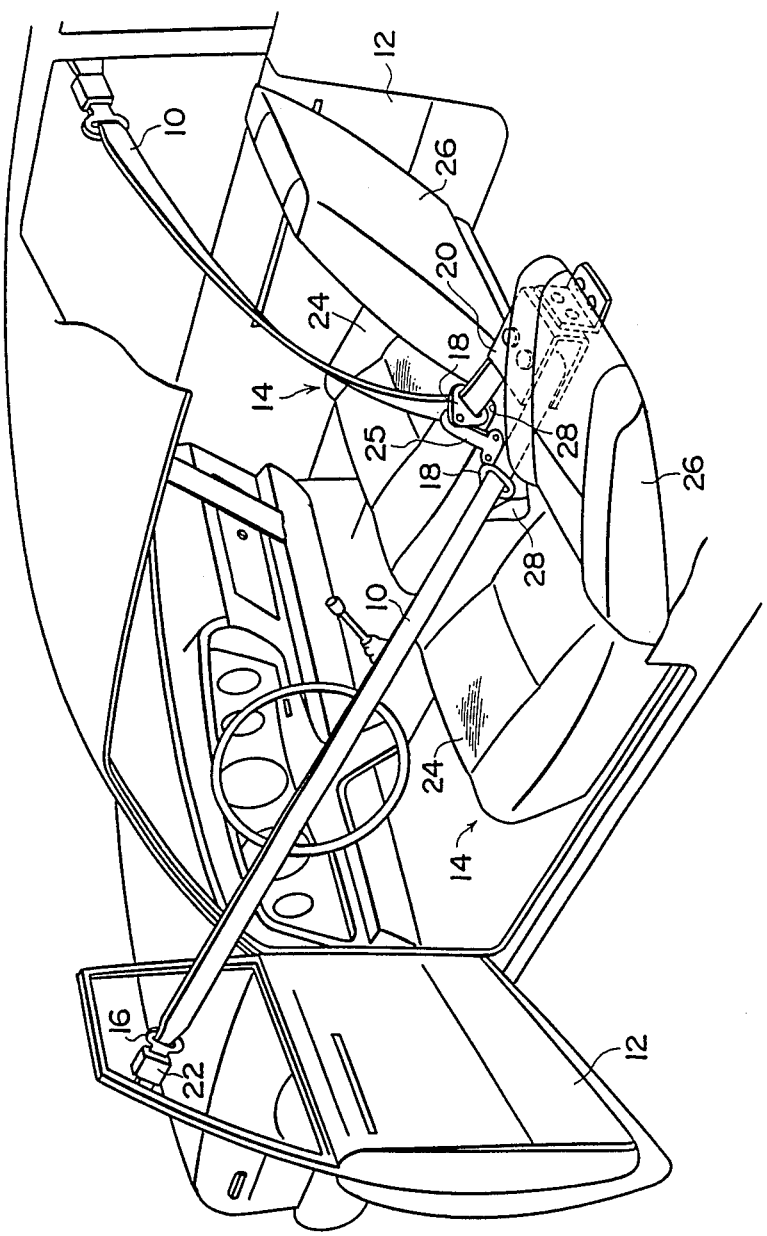
FIG. 1 is a fragmentary perspective view of an automobile to which one embodiment of the seat for a vehicle according to the present invention is applied, which schematically shows the front-seat side of the automobile.

The present invention will be described hereinunder in detail with reference to FIGS. 1 to 3 which show in combination one embodiment of the seat for a vehicle according to the present invention. FIG. 1 schematically shows the front-seat side of an automobile to which one embodiment of the present invention is applied.

This automobile is equipped with a so-called automatic seatbelt system in which a webbing 10 is automatically fastened to and unfastened from the body of an occupant seated in a seat 14 in response to the operation of closing and opening the corresponding door 12.

Each webbing 10 is connected at one end thereof to a tongue plate 16, and wound up from the other end thereof into a retractor 20 through an opening in a belt guide 18.

The tongue plate 16 is engaged with a buckle 22 which is rigidly secured to the rear upper portion of the door 12, the tongue plate 16 being able to be disengaged from the buckle 22 according to need.

The retractor 20 is secured to a floor member disposed in the substantially central portion of the vehicle, the retractor 20 being disposed at the rear of the seats 14. This retractor 20 incorporates an inertia type lock mechanism which is adapted to instantaneously stop each webbing 10 from being unwound when an emergency situation of the vehicle occurs.

Each belt guide 18 is pivotally supported by a plate 25 which is secured to that side of a seat cushion 24 of the corresponding seat 14 which is closer to the center of the vehicle so that the belt guide 18 allows the occupant to be maintained in a constant webbing fastened condition at all times regardless of the occupant's adjusting the position of the seat 14 in the longitudinal direction of the vehicle. Since the belt guide 18 is pivotally supported by the plate 25, it is pivoted in response to any change in the webbing pulling direction which occurs as the door 12 is opened or closed, thus minimizing the frictional resistance occurring between the webbing 10 and the belt guide 18.

The seat cushion 24 of each of the seats 14 mounted on this automobile is cut at a portion thereof which is in close proximity with the webbing 10 and in the vicinity of the belt guide 18 to provide a recess 28 which defines a webbing passage. This recess 28 allows a clearance to be ensured between the seat cushion 24 and a portion of the webbing 10 which is in close proximity with the seat cushion 24 when the occupant is not seated in the seat 14, as shown in FIG. 3, whereby the contact between the webbing 10 and the seat cushion 24 is prevented completely. Even if said contact is not prevented completely, the friction produced by the contact between the webbing 10 and the seat cushion 24 is minimized advantageously. In this embodiment, the recess 28 is formed by cutting a portion of the seat cushion 24 in such a manner that the recess 28 extends over from the upper surface to the side surface of the seat cushion 24, as shown in FIG. 1.

The following is a description of the operation of this embodiment.

Figure 2:
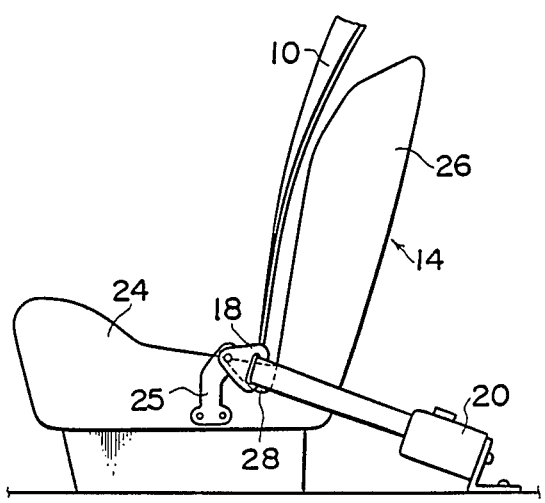
FIG. 2 is a side view of one of the seats shown in FIG. 1 as viewed from one side of the vehicle.
Figure 3:
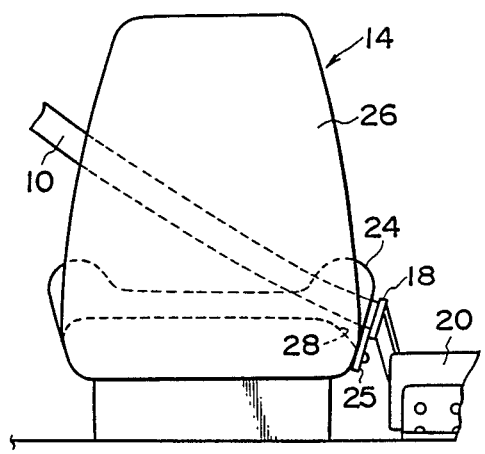
FIG. 3 is a rear view of the seat shown in FIG. 2 as viewed from the rear end of the vehicle.
Figure 4:
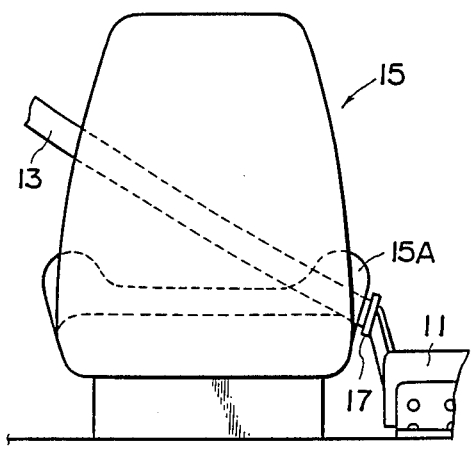
FIGS. 4 and 5 show in combination a conventional seat for illustrating the relationship between the seat and the associated seatbelt system.
Figure 5:
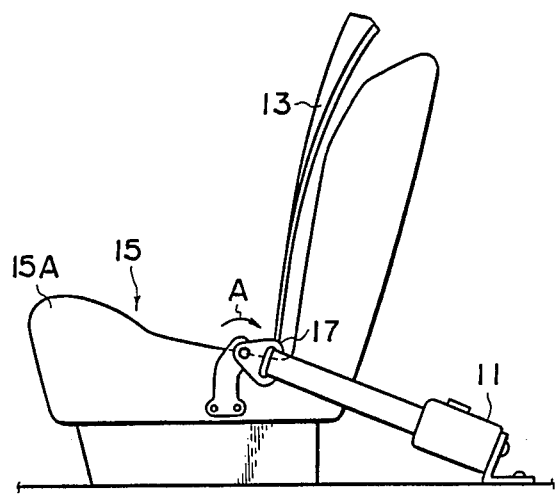

FIGS. 2 and 3 show the right-hand passenger seat 14 of the vehicle as viewed in FIG. 1 in a state wherein the corresponding door 12 is totally closed. In this state, the recess 28 causes a clearance to be formed between the webbing 10 and the seat cushion 24, so that the webbing 10 is not in contact with the seat cushion 24.

When the occupant opens the door 12 in order to enter the vehicle, the circular motion of the opening door 12 causes the intermediate portion of the webbing 10 to be unwound from the retractor 20, and while doing so, the webbing intermediate portion is moved toward the forward end of the vehicle, as shown by the webbing 10 for the driver's seat 14 in FIG. 1, thereby defining a space between the webbing 10 and the seat 14 for the occupant to enter the vehicle, and thus allowing him to enter the vehicle easily. At this time, the belt guide 18 is pivoted counterclockwise as viewed in FIG. 2 in response to the change in the direction of pull of the intermediate portion of the webbing 10 between the belt guide 18 and the tongue plate 16 which is caused by the movement of the webbing intermediate portion toward the forward end of the vehicle. Thus, the webbing 10 is smoothly unwound from the retractor 20 without any risk of a portion of the webbing 10 passed through the belt guide 18 being twisted. In addition, the webbing 10 is unwound without contacting the seat cushion 24 by virtue of the recess 28 formed in the seat cushion 24. Accordingly, there is no fear of the webbing 10 producing resistance against the force for opening the door 12, which resistance would otherwise be produced by the frictional contact between the webbing 10 and the seat cushion 24. Thus, the door 12 is opened smoothly.

When the occupant closes the door 12 after seating himself in the seat 14, the webbing 10 and the belt guide 18 are activated in the manner reverse to that in the case of opening the door 12. More specifically, the webbing 10 is rewound into the retractor 20, and while doing so, it is moved toward the rear end of the vehicle. During this movement, there is no fear of the webbing 10 contacting the seat cushion 24 or being twisted at a portion thereof which is passed through the belt guide 18. Accordingly, the webbing 10 is reliably wound up into the retractor 20 without any risk of the webbing 10 being defectively rewound due to the frictional contact which would otherwise occur betwee the webbing 10 and the seat cushion 24.

When the door 12 is in a totally closed state, the intermediate portion of the webbing 10 between the belt guide 18 and the tongue plate 16 is positioned on the occupant's breast so as to function as a shoulder webbing.

When, in this state, the occupant moves the seat 14 in the longitudinal direction of the vehicle in order to adjust the position of the seat 14, the belt guide 18 is pivoted in response to the movement of the seat 14, whereby the webbing intermediate portion between the belt guide 18 and the tongue plate 16 is disposed at an appropriate position on the occupant's breast at all times regardles of the position of the seat 14 thus adjusted. In other words, the adjustment of the seat position causes no change in the webbing fastened condition.

When the occupant opens the door 12 in order to leave the vehicle, the webbing 10 and the belt guide 18 are activated in the same manner as in the case where the occupant opens the door 12 in order to enter the vehicle. More specifically, in this case also, the webbing 10 is moved toward the forward end of the vehicle while being unwound from the retractor, and there is also no fear of the webbing 10 contacting the seat cushion 24 or being twisted at a portion thereof which is passed through the belt guide 18.

When the door 12 is in an open state, the webbing intermediate portion between the belt guide 18 and the tongue plate 16 is positioned on the side of the seat 14 which is closer to the forward end of the vehicle so as to define a space between the same and the occupant's body, thereby allowing the occupant to leave the vehicle easily.

When the occupant closes the door 12 after leaving the vehicle, the webbing 10 and the belt guide 18 are activated in the same manner as in the case where the occupant closes the door 12 after seating himself in the seat 14. More specifically, the webbing 10 is moved toward the rear end of the vehicle while being rewound into the retractor 20, and during this movement there is no risk of the webbing 10 contacting the seat cushion 24 or being twisted at a portion thereof which is passed through the belt guide 18.

When the door 12 is in this closed state, the webbing intermediate portion between the belt guide 18 and the tongue plate 16 is positioned on the side of the seat 14 which is closer to the rear end of the vehicle, as shown by the webbing 10 for the right-hand passenger seat in FIG. 1.

Thus, in this embodiment the recess 28 formed in the seat cushion 24 enables a clearance to be ensured between the seat cushion 24 and the webbing 10 when the occupant is not seated in the seat 14. Therefore, the clearance is ensured between the seat cushion 24 and the webbing 10 at all times. In consequence, there is no fear of the webbing 10 contacting the seat cushion 24, and they are prevented from being damaged by the contact which would otherwise occur. In addition, since no friction occurs between the webbing 10 and the seat cushion 24, there is no risk of the webbing 10 being defectively wound up into the retractor 10, and the webbing 10 applies no frictional resistance to the force for opening the door 12.

As has been described above, the seat for a vehicle according to the present invention has a seat cushion which is provided with a passage for the webbing of a seatbelt system. Accordingly, it is possible to prevent the contact between the webbing and the seat cushion, advantageously.

What is claimed is:

1. A seat for use in a vehicle equipped with an automatic sealbelt system of the type in which an occupant restraining webbing, which is wound up from one end thereof into a webbing retractor disposed in the substantially central portion of the vehicle as viewed in the lateral direction thereof and which is retained at the other end thereof by a door of the vehicle, is automatically fastened to and unfastened from the body of an occupant in response to the operation of closing and opening said door, and which includes a belt guide for slidably guiding an intermediate portion of the webbing, wherein said belt guide is connected to a plate which is rigidly affixed to side of the vehicle seat, comprising:
   (a) a seat cushion having an upper surface for supporting the buttocks of an occupant of the vehicle;
   (b) a seat back for supporting the back of the occupant;
   (c) a pivotal connection between said belt guide and said plate that is located at substantially the same height as the upper surface of the seat cushion, and
   (d) a webbing passage provided in said seat cushion for preventing the webbing from rubbing against the seat cushion when the occupant extends and retracts the webbing incident to fastening and unfastening the webbing, said passage being formed by a recessed portion provided along part of the width of the seat cushion which extends below the upper surface of the seat cushion to the side surface thereof adjacent to said belt guide, said recessed portion being dimensioned so that said webbing will not contact the surface of the recessed portion even when said webbing is twisted in the vicinity of the belt guide.

2. A seat for a vehicle according to claim 1, wherein said belt guide is supported by a plate rigidly secured to the side of said seat cushion which is closer to the center of the vehicle in such a manner that said belt guide is pivotal in the longitudinal direction of the vehicle.

3. An improved automatic seatbelt system for use in a vehicle of the type in which an occupant restraining webbing, which is wound up from one end thereof into a webbing retractor disposed in the substantially central portion of the vehicle and which is retained at the other end thereof by the door of the vehicle, is automatically fastened and unfastened from the body of an occupant in response to the operation of closing and opening said door, and which includes a belt guide for slidably guiding an intermediate portion of the webbing, said belt guide being connected to a plate which is rigidly affixed to the side of the vehicle's seat, as well as a seat cushion having an upper surface for supporting an occupant of the vehicle, and a seat back for supporting the back of the occupant, and a pivotal connection between said belt guide and said plate that is located at substantially the same height as the upper surface of the seat cushion, wherein the improvement comprises:
   webbing passage provided in said seat cushion for preventing the webbing from rubbing against the seat cushion when the occupant extends and retracts the webbing incident to fastening and unfastening the webbing, said passage being formed by a recessed portion provided along part of the width of the seat cushion which extends below the upper surface of the seat cushion to the side surface thereof adjacent to said belt guide.

* * * * *